Figure 1:
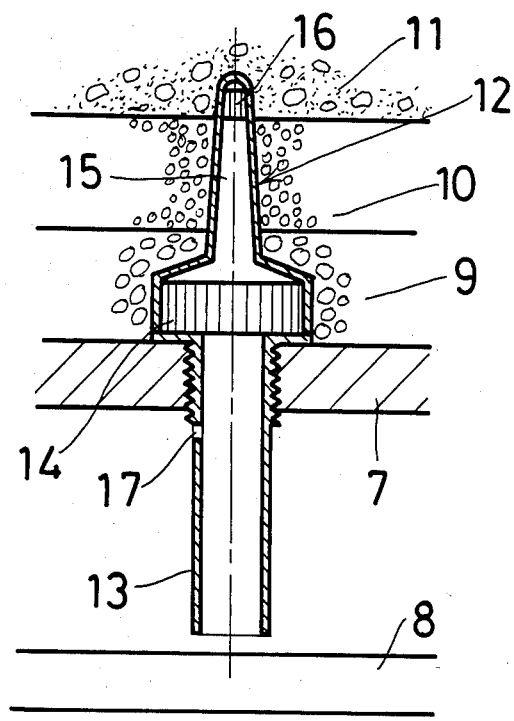

United States Patent [19]
Moore

[11] Patent Number: 4,608,168
[45] Date of Patent: Aug. 26, 1986

[54] DISTRIBUTION FILTER NOZZLES AND FILTERS INCORPORATING SAME

[75] Inventor: Richard P. Moore, Germiston, South Africa

[73] Assignee: Blue Circle Projects (Proprietary) Ltd., Johannesburg, South Africa

[21] Appl. No.: 388,526

[22] Filed: Jun. 15, 1982

[30] Foreign Application Priority Data

Jun. 17, 1981 [ZA] South Africa ............... 81/4146

[51] Int. Cl.$^4$ ................................. B01D 23/20
[52] U.S. Cl. .......................... 210/274; 210/279; 210/289; 210/290; 210/291
[58] Field of Search ............... 210/163, 291, 292, 293, 210/460, 461, 274, 279, 285, 286, 289, 290, 456

[56] References Cited

U.S. PATENT DOCUMENTS

| | | | |
|---|---|---|---|
| 739,621 | 9/1903 | Selg et al. | 210/460 X |
| 2,723,761 | 11/1955 | Van Der Made et al. | 210/290 X |
| 3,826,375 | 7/1974 | Fournier | 210/291 |
| 3,869,381 | 3/1975 | Graveland et al. | 210/289 X |

*Primary Examiner*—David Sadowski
*Attorney, Agent, or Firm*—Bacon & Thomas

[57] ABSTRACT

A filter employing a discrete particle filter medium (3,11), such as graded sand or the like, in which the outlet passage (6) located at the bottom (1, 29,8) of a bed of filter medium is provided in which air can be employed in the backwashing process to agitate the filter medium. The filter has shallow coarser layers (9,10,28) of particulate material beneath the filter medium (11) itself and one set of outlet nozzles (14,19,27) having appropriately dimensional perforations positioned in the coarser or coarsest particle layer (9,28). In addition further finer perforated surfaces (16,23,30) communicate with the bottom of the filter medium (11) itself and the arrangement is such that when air is introduced preparatory to, or during backwashing the air emerges predominantly from the elevated finer perforated surfaces (16,23,30).

10 Claims, 4 Drawing Figures

DISTRIBUTION FILTER NOZZLES AND FILTERS INCORPORATING SAME

This invention relates to distribution filter nozzles and to filters incorporating same, and, more particularly, to nozzles and arrangements of nozzles for use in filters which employ a bed of discrete particles as the filter medium.

Filters of the type under consideration generally comprise a bed of discreet particles such as graded sand, onto which the liquid to be filtered is distributed. The filtrate is withdrawn from the lower region of the bed via nozzles which may communicate with pipes, ducts, or a chamber defined between a generally horizontal wall or floor spaced apart upwardly from the bottom of the filter housing.

The purpose of the nozzle is to retain the particles of the filter medium in the bed but to allow the filtrate to pass therethrough. These nozzles are furthermore employed for backwashing the filter bed in which case liquid is passed in a reverse direction through the nozzles and upwardly through the filter bed to clear it of dirt collected thereby. Before backwashing it is good practice to agitate the filter medium to loosen the dirt from the particles. One of the most efficient and economic methods of doing this is with air distributed throughout the areas of the filter bed by specially designed nozzles.

Usually nozzles of this nature have a series of slots therein with the slot width determining the size of particles which will be retained. In filters having only a single layer of particles the slots must be extremely narrow in order to prevent the particles from passing through the nozzle together with the filtrate. Such nozzles tend to block up to a certain extent, thereby resulting in excessive friction and resistance to flow through the nozzles.

This difficulty can be overcome by providing one or more thin support layers of coarser graded material and this enables the slots in the nozzles to be made substantially broader and to avoid the disadvantage of their becoming partially blocked. However, this has a further disadvantage where air is employed to agitate the particles prior to, or during backwash, in that the agitation tends to disrupt the graded layers and cause mixing of the particles thereof with those of the filter bed. This is particularly the case when air and water are fed together and when they emerge from the same nozzle orifices into the support layers.

Clearly numerous graded layers could be provided thereby resulting in a final filter bed of appreciable thickness. However, this is not considered to be a practical solution to the problem in view of the high cost involved in addition to the mixing action.

It is the object of this invention to provide nozzles and arrangements thereof as well as filters embodying same wherein the abovedescribed disadvantages are overcome, at least to some extent.

In accordance with this invention there is provided a filter embodying an assembly of nozzles communicating with at least one outlet passage, the nozzles providing two sets of vertically spaced perforated nozzle surfaces the lower of which are adapted to retain larger particles than the upper perforated nozzle surfaces which are adapted to extend into, and retain a relatively fine filter medium, the arrangement being such that, in use, at least a major proportion of air employed for agitation for the purposes of backwashing is emitted through the upper set of nozzle surfaces.

Further features of the invention provide for the perforated nozzle surfaces to be defined by a series of narrow parallel slots formed through the wall of the nozzle; for the area of the perforated surfaces associated with the lowermost set of nozzle surfaces to be substantially greater than that associated with the upper set; and for the nozzles to be fitted into apertures in a wall of floor defining an outlet chamber with the bottom of a filter body or, alternatively, to be fitted through the walls of outlet ducts of a manifold or the like.

The upper and lower perforated surfaces can be provided in the same nozzle or in seperate nozzles. Thus in one case the lower nozzles are made to a cylindrical shape of substantially greater width or diameter or both relative to that of the upper nozzles and the two perforated surfaces can be provided in the same body which has a reduced diameter at or towards its upper end. Alternatively a simply cylindrical nozzle having slots in the cylindrical wall thereof can be employed as the lower set of nozzle surfaces whilst the upper set of nozzle surfaces are provided in separate nozzle units of elongated shape. In either case a path for air is designed to direct air, introducted alone or together with liquid to the upper perforated surfaces.

In the case where both nozzle surfaces are provided in a single unit a transverse orifice can be provided in a tubular stem extending downwardly from the wall or floor in which the nozzle is located. This orifice which would be termed a metering orifice, controls the flow of air into the nozzle and, with the upper air distributing perforated nozzle surfaces air will automatically rise to escape through the upper nozzle surfaces.

In the case where separate nozzle units are employed, the tubular portion associated with the upper set of nozzle surfaces, which defines the metering orifice, is located vertically higher than the bottom end of the tubular extension associated with the other set of nozzles. In this arrangement the air will accumulate in the upper region of the outlet chamber and thus exit only through the upper set of nozzle surfaces.

In a further arrangement in which nozzles are installed to extend through the wall of a pipe, separate nozzles can be advantageously installed to define the two sets of nozzle surfaces. In such a case the nozzle surfaces having the smaller perforations associated therewith are located vertically above the other nozzle surfaces and optionally laterally offset therefrom.

It will be understood that in all cases the lower set of nozzle surfaces are, in use, located below the top of a layer of coarser particulate material and one or more graded layers can be provided above this bottom layer as necessary. In either event the upper set of nozzle surfaces is located substantially within the operative filter bed which is of a single grade for its entire depth.

Thus, in use, an arrangement as above described operates with the majority of liquids being filtered passing through the filter bed and then through the graded particulate layers at the bottom thereof and them into the lower set of nozzle surfaces. Clearly a small amount of filtered liquid will also pass through the upper set of nozzle surfaces.

When backwashing is commenced and air is introduced into the system the air emerges primarily through the upper set of nozzle surfaces simply as a result of the fact that air rises in water. This air agitates the filter bed without disturbing the graded layers of particulate material which serve to shield the larger and lower nozzle surfaces.

Figure 2:
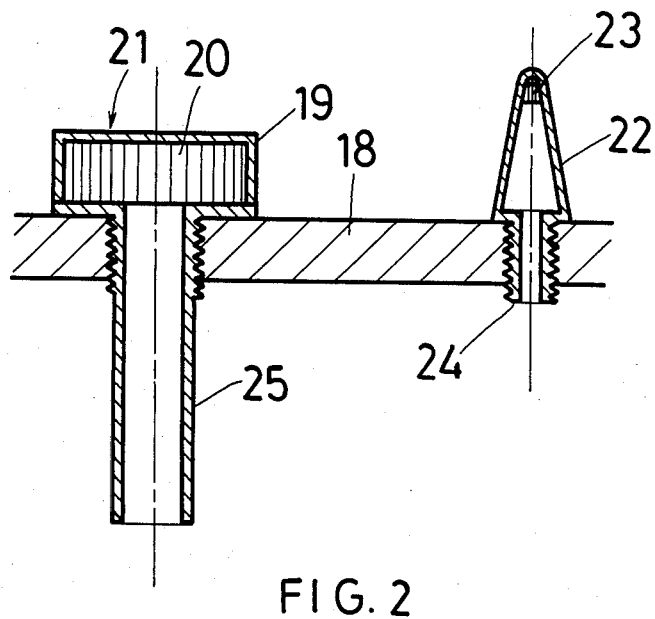
Figure 3:
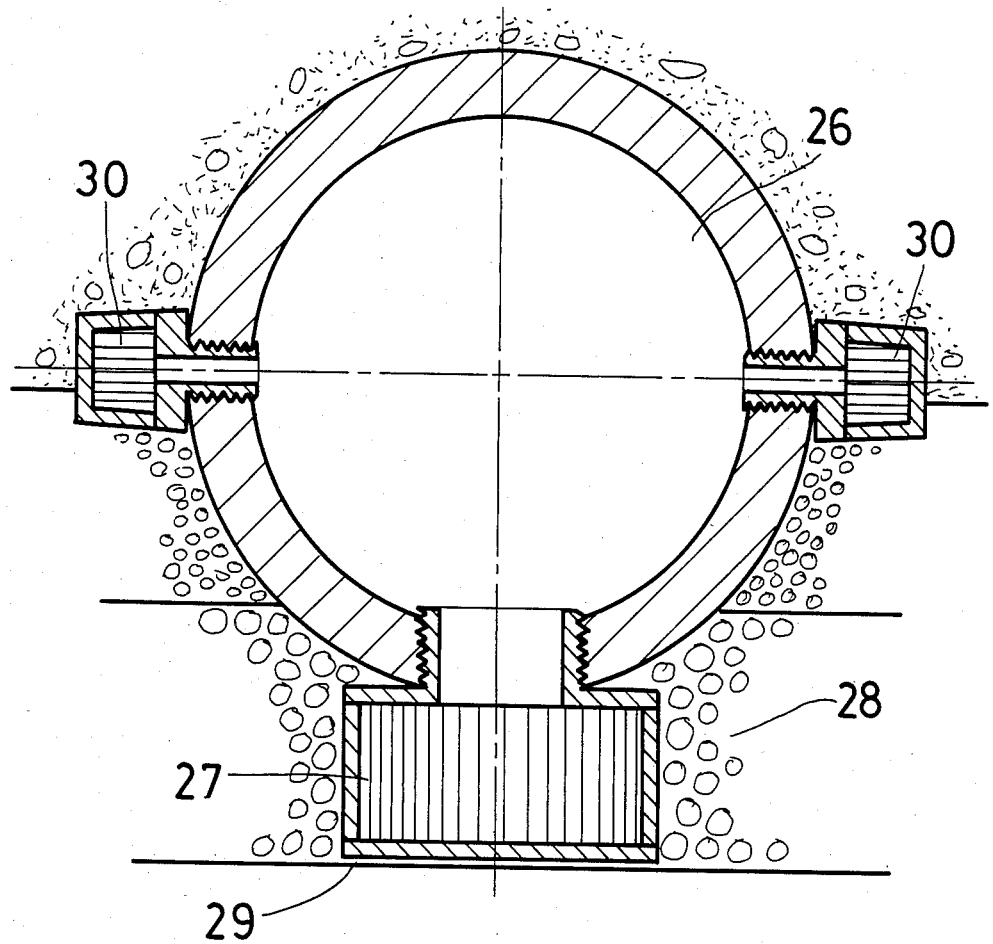
Figure 4:
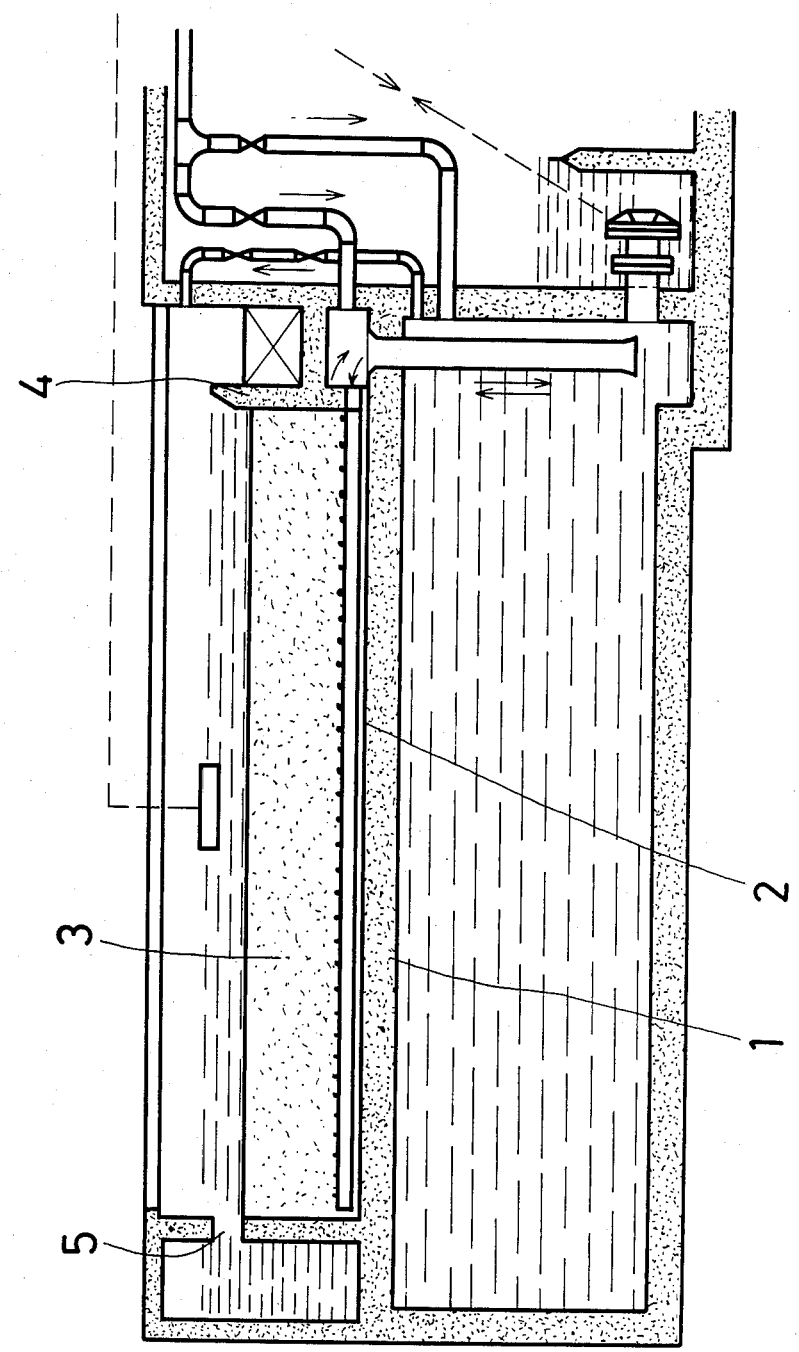

In order that the invention may be more fully understood three different embodiments thereof will now be described with reference to the accompanying drawings in which:

FIGS. 1 and 2 are sectional elevations of each of two different nozzle arrangements employed in a wall or floor defining an outlet chamber, FIG. 3 illustrates in cross-section an alternative form in which manifold tubes are used as outlets from the filter, and, FIG. 4 illustrates a complete filter unit of the type with which the invention is concerned.

Referring firstly to FIG. 4 there is illustrated schematically, a filter comprising a bottom 1 optionally having a spaced wall to define an outlet passage 2, and filter medium 3 supported in the filter container 4.

An inlet 5 is provided for distributing water or other liquids to be filtered over the top surface of the bed 3 and a nozzle collecting and distributing system is provided below the filter bed.

Referring now to FIG. 1, the outlet passage is defined in this case by a wall or floor 7 spaced apart from a bottom 8 to the container.

The wall supports the bed of particulate material which, in this case, comprises a lowermost layer of fairly coarse particulate material indicated by numeral 9, a second layer of finer particulate material indicated by numeral 10, and the main body of the filter bed indicated by numeral 11. The two lowermost layers 9 and 10 are relatively narrow bands and nozzles 12 are provided for collection and distributing at least the bulk of the filtrate and backwash water respectively.

Each nozzle has a lower tubular extension 13 passing through the wall or floor 7 and downwardly into the space between the floor and bottom of the container. Immediately above the wall is an enlarged diameter section 14 having axially extending slots therethrough to provide a perforated cylindrical surface. This entire surface is located beneath the top of the lowermost layer 9 of particulate material.

An upwardly directed extension 15 communicates with the interior of the nozzle and the extension is sufficiently long such that a series of axially extending slots 16 in the upper end thereof open into the uppermost layer 11 of the filter medium.

An air metering orifice 17 is provided in the lower tubular extension just below the bottom surface of the wall or floor 7, through which it extends.

In operation it will be understood that liquid being filtered passes primarily through the enlarged slotted region 14 located in the coarser particulate layer 9. A small amount of liquid will, naturally pass through the slotted area 16 as well.

When backwashing is to be achieved, both air and water can be introduced in a reverse direction such that the water passes up the extension. The transverse hole 17 communicates with the upper region of the outlet chamber and air can enter through this hole. The air is carried up by reason of its very nature and emerges out of the slotted surface 16 at the top of the nozzle. Water may also emerge through such slotted surface, but predominantly emerges through the lower enlarged slotted surface 14.

In the above manner the air necessary to achieve agitation is introduced into the uppermost layer of filter medium and the water can be introduced, at least to a major extent, via the lower cylindrical slotted surface 14. The coarser particulate layers are thus left undisturbed whilst the advantages of agitation with the aid of the air are achieved.

Clearly numerous different forms of the invention are possible. Thus, turning to FIG. 2, there is illustrated a similar floor or wall 18 with two different types of nozzles associated therewith. The one type indicated by numeral 19 simply provides a cylindrical slotted surface 20 adapted to be located in the lower coarse layer of material as described above. This nozzle has a plain end wall 21 defining its upper end.

A second form of nozzle 22 is installed through the wall or floor 18 and these nozzles have an elongated conical shape with a slotted surface 23 at the upper end thereof. This surface is located to be in the uppermost filter media layer in use.

In order to ensure that air passes primarily through the latter form of nozzle, the lowermost end 24 thereof is located just inside the lower surface of the wall or floor 18 whilst the tubular extension 25 of the first described nozzle 19 extends down to a position described with reference to FIG. 1. The inner diameter of the tubular extension defines a metering orifice.

It will be understood that the above arrangement will operate in exactly the same manner as the arrangement described with respect of FIG. 1.

FIG. 3 illustrates a still further embodiment of the invention in which the outlet from the filter is defined by a series of tubes 26 supported a short distance above the bottom of the filter container. In this case the lower nozzles 27 having the broader slots and located in the coarsest layer 28 of particulate material are located in the underside of the tube and against the bottom 29 of the container. In this case the nozzles 30 having the smaller slots and being at a lever higher than that described above communicate through the side walls of the pipe at a suitable elevation. In this case air will again be primarily emitted through the raised nozzles 30 whilst water will be emitted through the lower nozzles 27 during backwashing.

It will be understood that numerous other variations may be made to the above described embodiments of the invention without departing from the scope hereof. In particular the nozzle shape and configuration can be changed as required.

It is to be understood that nozzles particularly adapted for carrying out this invention are also intended to fall within the scope hereof.

What I claim as new and desire to secure by Letters Patent is:

1. In a filter having at least two layers of particulate filter media with a first, fine filter media supported on a second, coarse lower layer, the improvement comprising: (a) at least one nozzle assembly communicating with at least one filter outlet passage, the nozzle assembly defining two vertically spaced sets of perforated nozzle surfaces a first, upper set of perforated nozzle surfaces extending into the first, fine filter media and defining first openings of a given size, and a second, lower set of perforated nozzle surfaces extending into the lower layer of coarse filter media and defining second openings of greater size than the first openings; (b) means for introducing liquid into the second, lower nozzle surface for backwashing said particulate filter media; and (c) means for introducing air into the first, upper nozzle surfaces, said means located at a higher level than said means for introducing liquid into the second, lower set of perforated nozzle surfaces.

2. A filter as claimed in claim 1 in which the first and second sets of perforated nozzle surfaces are each defined by a series of slots, with those slots in the upper set of nozzle surfaces being narrower than those slots in the lower set of nozzle surfaces.

3. A filter as claimed in claim 1 in which the surface area of the second, lower set of nozzle surfaces is substantially greater than that of the first, upper set of nozzle surfaces.

4. A filter as claimed in claim 1 in which the at least one nozzle assembly is fitted in at least one aperture provided in a wall or floor defining, with a bottom of the filter, an outlet passage in the form of a chamber.

5. A filter as claimed in claim 4 in which separate nozzles are provided with said upper and lower perforated nozzle surfaces and wherein the former are located physically above the latter.

6. A filter as claimed in claim 4 in which the upper set of nozzle surfaces are provided in the same nozzle assembly as the lower set of nozzle surfaces and are located vertically above the latter.

7. A filter as claimed in claim 6 in which the nozzle assembly has a downwardly directed tubular extension projecting into the outlet passage chamber, the tubular extension also also defining an air inlet orifice at a position near the underside of the wall or floor in which the nozzle assembly is located.

8. A filter as claimed in claim 1 in which the at least one nozzle assembly is carried by an outlet duct forming part of a manifold system and the nozzle assembly communicating between the inside and outside of the duct.

9. A nozzle assembly for use in a filter as claimed in claim 1 having a tubular extension passing through a supporting wall or floor in which the nozzle assembly is located, the tubular extension defining an air inlet opening through a side wall, wherein the nozzle assembly has two spaced apart perforated nozzle surfaces, the two nozzle surfaces defining perforations of different sizes.

10. A nozzle assembly as claimed in claim 9 in which the two spaced apart perforated nozzle surfaces are circumferentially distributed about a tubular body and are spaced apart in a direction parallel to the longitudinal axis of the tubular body.

* * * * *